(12) United States Patent
Chen et al.

(10) Patent No.: US 7,887,013 B2
(45) Date of Patent: Feb. 15, 2011

(54) FIXING MECHANISM

(75) Inventors: Fu-Shen Chen, Taipei (TW);
Shih-Huang Ou, Taipei (TW)

(73) Assignee: TVM Corp., Taipei (TW)

( * ) Notice: Subject to any disclaimer, the term of this patent is extended or adjusted under 35 U.S.C. 154(b) by 213 days.

(21) Appl. No.: 12/203,263

(22) Filed: Sep. 3, 2008

(65) Prior Publication Data
US 2009/0278002 A1  Nov. 12, 2009

(30) Foreign Application Priority Data
May 12, 2008  (CN) .................... 2008 2 0115021 U

(51) Int. Cl.
*F16L 5/00* (2006.01)

(52) U.S. Cl. .................... 248/56; 248/176.1; 16/2.4; 411/85

(58) Field of Classification Search ........... 174/666, 174/669; 248/176.1, 56; 16/2.4; 411/85
See application file for complete search history.

(56) References Cited

U.S. PATENT DOCUMENTS

| | | | | |
|---|---|---|---|---|
| 219,099 | A * | 9/1879 | Johnson ........................ | 16/2.4 |
| 4,324,424 | A * | 4/1982 | Woodliff et al. ......... | 285/149.1 |
| 4,616,105 | A * | 10/1986 | Borsh ........................ | 174/660 |
| 4,666,355 | A * | 5/1987 | Stover ........................ | 411/85 |
| 5,204,499 | A * | 4/1993 | Favalora .................... | 174/669 |
| 5,422,437 | A * | 6/1995 | Schnell ....................... | 174/660 |
| 6,780,029 | B1 * | 8/2004 | Gretz ........................ | 439/92 |
| 7,205,489 | B2 * | 4/2007 | Auray et al. ................ | 174/666 |
| 7,214,890 | B2 * | 5/2007 | Kiely et al. ................ | 174/666 |
| 7,264,212 | B2 * | 9/2007 | Hung ...................... | 248/282.1 |
| 7,358,448 | B2 * | 4/2008 | Auray et al. ................ | 174/666 |
| 7,488,905 | B2 * | 2/2009 | Kiely et al. ................ | 174/666 |
| 2007/0272812 | A1 * | 11/2007 | Bauer et al. ............... | 248/274.1 |

FOREIGN PATENT DOCUMENTS

| | | |
|---|---|---|
| CN | 2479550 Y | 2/2002 |
| CN | 2498713 Y | 7/2002 |
| CN | 1641231 A | 7/2005 |
| CN | 1880783 A | 12/2006 |

* cited by examiner

*Primary Examiner*—Terrell Mckinnon
*Assistant Examiner*—Bradley H Duckworth
(74) *Attorney, Agent, or Firm*—Chun-Ming Shih

(57) ABSTRACT

A fixing mechanism includes a base, a stud and an elastic clamping member. The base is arranged at a side of an object. The base includes a through hole defined therein. The stud includes a threaded hole defined therein. The stud includes a cap portion received in the through hole and a main body passing through the through hole. An engaging groove is defined in a surface of the main body. The elastic clamping member includes an annulus end surface, and a truncated cone surface extending from an inner edge of the annulus end surface. The annulus end surface is pressed against onto with the base. A number of gaps are radially arranged in the truncated cone surface thereby defining a number of clamping portions between the gaps. The clamping portions are engaged with the engaging groove thereby cooperatively clamping the stud.

11 Claims, 4 Drawing Sheets

FIXING MECHANISM

BACKGROUND

The present invention generally relates to a fixing mechanism, in particular, to a fixing mechanism using stud and an elastic clamping member to prevent the stud from releasing.

Generally, studs are shaped parts each with a threaded hole formed therein. Studs can be mounted in a base and the threaded holes thereof can be exposed outside. A number of bolts can be engaged with the studs thereby fixing the base on a supporting member.

Liquid crystal displays (LCDs) usually include a back plate made of metallic material. The back plate usually includes a number of threaded holes defined therein. The threaded holes are usually exposed to a rear side of the back plate. The threaded holes are used to engage with bolts such that the back plate can be fixed on a supporting member (e.g. a shelf or a hanger). For example, in some public areas, LCDs are hung on hangers.

It is known that aforementioned threaded holes are actually formed in studs, and the studs are pre-mounted in the metallic back plate. Video Electronics Standards Association (VESA) has published an international standard for threaded holes in studs used for fixing LCDs. Currently, threaded holes in LCDs are all fit to the standard.

During assembling of the studs and the back plate, the studs can be directly pressed into the back plate. In order to reduce cost of materials and minimize volume of LCDs, the back plate is becoming thinner and thinner. However, when studs are mounted in thin back plates, bonding force between the studs and the back plates is weak; as a result, the studs can't be used to support relative heavy LCDs.

In related arts, there are several techniques that have been developed to solve similar problems. For example, Chinese published patent application under No. CN1841231A discloses a connecting studs and clamping members for used in cars, in which a "Ω" shaped clamping member including a connecting hole is employed to engage with a bolt so that an object is secured between the bolt and the clamping member. Chinese published patent application under No. CN1880783A also teaches a steel wire clamp fixing mechanism, in which a steel wire clamp and a helical spring are mounted on a column. The steel wire clamp presses the helical spring. However, these mechanisms are not suitable to directly apply in LCDs. In addition, these mechanisms also fail to provide more load capacity for studs.

BRIEF SUMMARY

An object of the present invention is to provide a fixing mechanism, and in particular, to provide a fixing mechanism that can support a heavy load while mounted in thin back plates.

In one exemplary embodiment, a fixing mechanism includes a base, a stud, and an elastic clamping member. The base is arranged at a side of an object. The base includes at lease one through hole defined therein. The stud includes a threaded hole defined therein. The stud includes a cap portion received in the through hole and a main body passing through the base. An engaging groove is defined in a surface of the main body. The elastic clamping member includes an annulus end surface, and a truncated cone surface extending from an inner edge of the annulus end surface. A number of gaps are radially arranged in the truncated cone surface thereby defining a number of clamping portions between the gaps. The clamping portions and the gaps cooperatively define a hole among thereof for the main body of the stud to pass through. The annulus end surface is pressed against onto the base at a location surrounding the through hole. The clamping portions are engaged with the engaging groove thereby cooperatively clamping the stud for being positioned on the base.

The assembly of clamping portions, the annulus end surface and the truncated cone surface are capable of distributing a force that is originally applied to the through hole from the stud to a peripheral area in the base around the through hole. Therefore, the through hole is protected from dilapidating or chapping. Moreover, the elastic clamping member can improve a load capacity of the base and the stud, especially for a thin-type base, to make the fixing mechanism of the present embodiment has more stability, reliability and lifetime.

In another exemplary embodiment, a fixing mechanism for fixing a base on an object includes a stud with a threaded hole defined therein, the stud passing through the base, an engaging groove is defined in a surface of the stud; and an elastic clamping member comprising an end surface and a plurality of clamping portions extending from the end surface, the clamping portions being engaged with the engaging groove thereby cooperatively clamping the stud.

Each of the clamping portions is spaced apart from each other, the clamping portions surround the stud, the stud is perpendicular to the end surface, and the clamping portions are arranged in an equal angle interval manner relative to the stud.

In still another exemplary embodiment, a assembly includes an object; a base; a stud with a threaded hole defined therein, the stud passing through the object and the base, an engaging groove is defined in a surface of the stud; and an elastic clamping member comprising an end surface and a plurality of clamping portions extending from the end surface, the end surface is in contact with the base, the clamping portions being engaged with the engaging groove thereby cooperatively clamping the stud.

The present invention will be described in detail with reference to Figures as following:

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
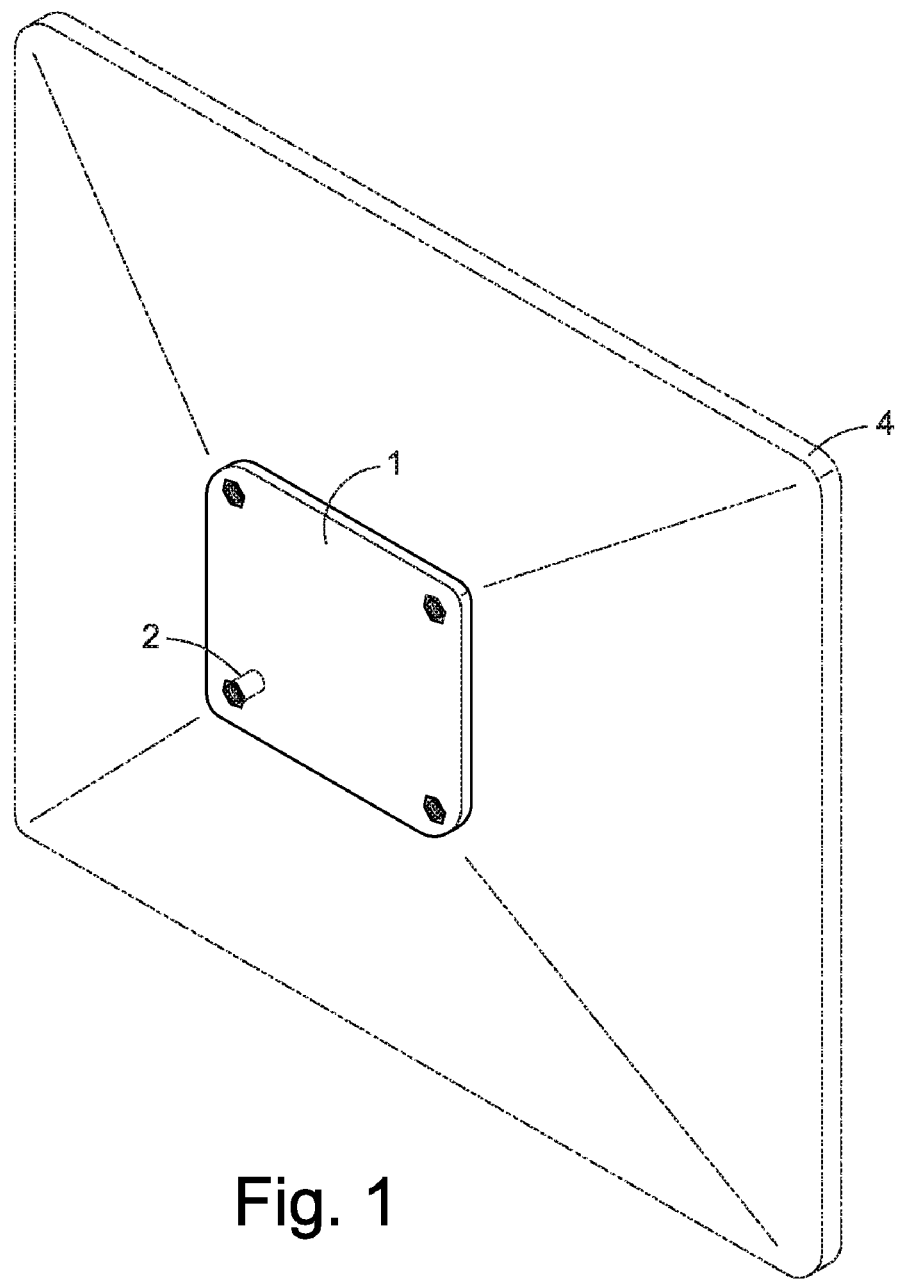
FIG. 1 is a prospective view of an object to be fixed.

FIG. 1 illustrates a prospective view of an object 4 to be fixed. Referring to FIGS. 2 through 5, a fixing mechanism, in accordance with an embodiment, includes a base 1, a stud 2 and a circular elastic clamping member 3. The stud 2 includes a threaded hole 20 defined therein.

The base 1 can be a portion of the object 4 (as shown in FIG. 1) or be fixed on the object 4. The base 1 is capable of holding the object 4. In the present embodiment, the object 4 can be a LCD or other device-to-be-hung. The base 1 can be made of metallic plate, non-ferro alloy plate or any other material (e.g. plastic plate) that has adequate strength.

Figure 2:
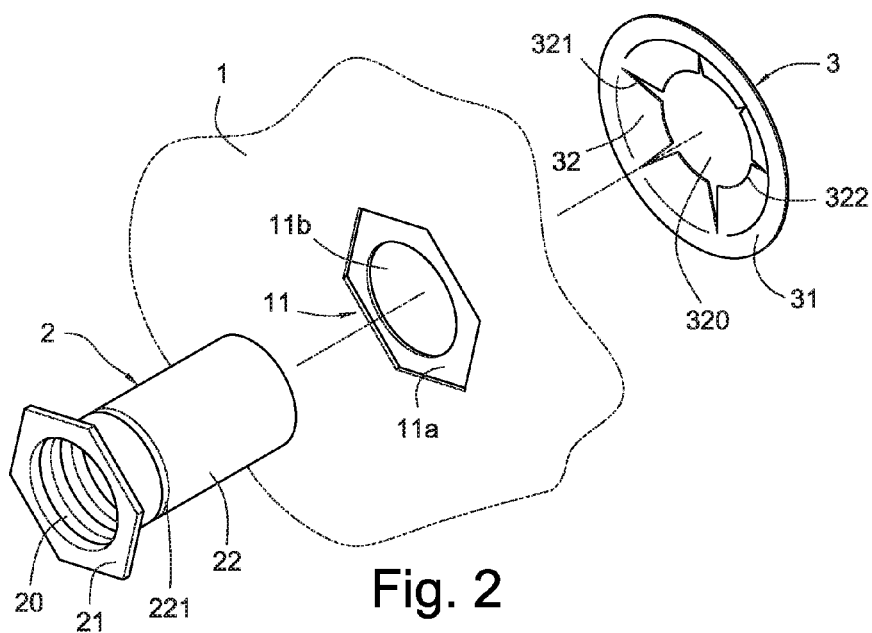
FIG. 2 is an exploded view of a fixing mechanism in accordance with the present embodiment.

The base 1 includes at least one through hole 11 defined therein (as shown in FIG. 2). The stud 2 includes a cap portion 21 and a main body 22. The cap portion 21 can be received in the through hole 11. The main body 22 passes through the thorough hole 11 and is exposed outside. An engaging groove 221 is defined around a surface of the main body 22.

Figure 4:
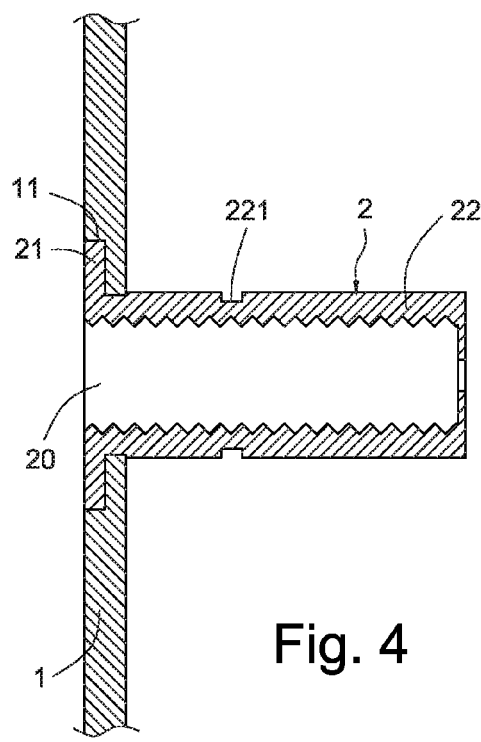
FIG. 4 is a cross sectional view of the fixing mechanism of FIG. 2.

In the present embodiment, the through hole 11 is formed as a shoulder hole in a gape form, specifically, the through hole 11 includes a receiving groove 11a and a through hole portion 11b. The through hole portion 11b is capable of allowing the main body 22 to pass through. The cap portion 21 of the stud 2 is structured to mate with the receiving groove 11a such that they are in tightly contact with each other and the cap portion 21 is non-rotatably received in the receiving groove 11a (as shown in FIG. 4). During a manufacturing process, when the base 1 is made of metallic plate or non-ferro alloy plate, the though hole portion 11b can be pre-formed in the base plate 1, and the stud 22 is placed in the through hole portion 11b, finally, the stud 22 is pressed and the cap portion 21 is embedded into the base 1 thereby forming a receiving groove 11a that is structured to mate with the cap portion 21. The cap portion 21 and the receiving groove 11a are in un-round shape, for example, polygonal, elliptic, eccentric circular . . . etc. In addition, when the base 1 is made of metallic plate or plastic plate, the receiving groove 11a and the through hole portion 11b can also be integrally and directly formed with the base 1 using a stamping/press method. In this instance, the receiving groove 11a is also structured to mate with the cap portion 21.

Figure 3:
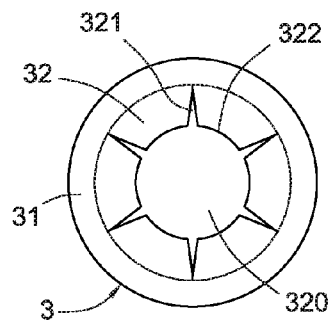
FIG. 3 is a front view of an elastic clamping member in the fixing mechanism of FIG. 2.

The elastic clamping member 3 (as shown in FIGS. 2 and 3) is substantially made of a flexible material such as metal with high carbon content (e.g. spring steel), elastic non-ferro alloy (e.g. aluminum alloy) or plastic . . . etc. The elastic clamping member 3 can be manufactured using a process of pressing, extrusion or molding. The elastic clamping member 3 has an annulus end surface 31 and a truncated cone surface 32 extending from an inner edge of the annulus end surface 31. A number of gaps 321 are radially arranged in the truncated cone surface 32 thereby defining a number of clamping portions 322 between the gaps 321. The clamping portions 322 and the gaps 321 cooperatively define a hole 320 among thereof.

Figure 5:
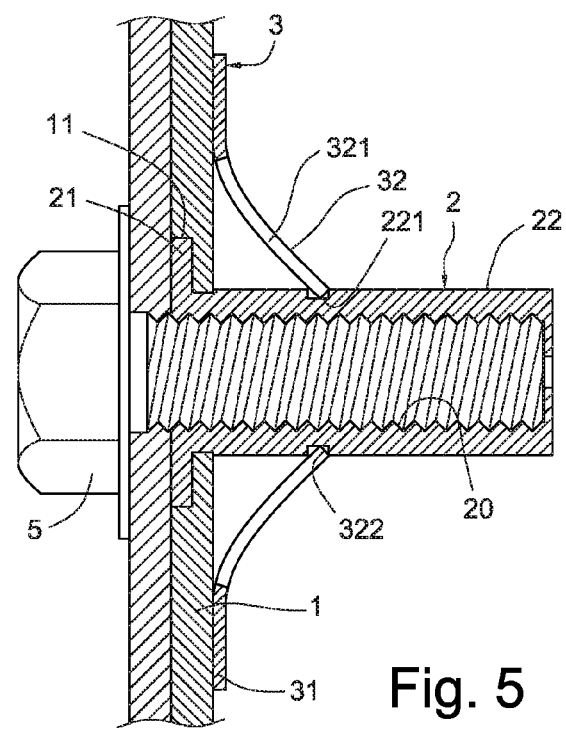
FIG. 5 is another cross section view of the fixing mechanism of FIG. 2.
Figure 6:
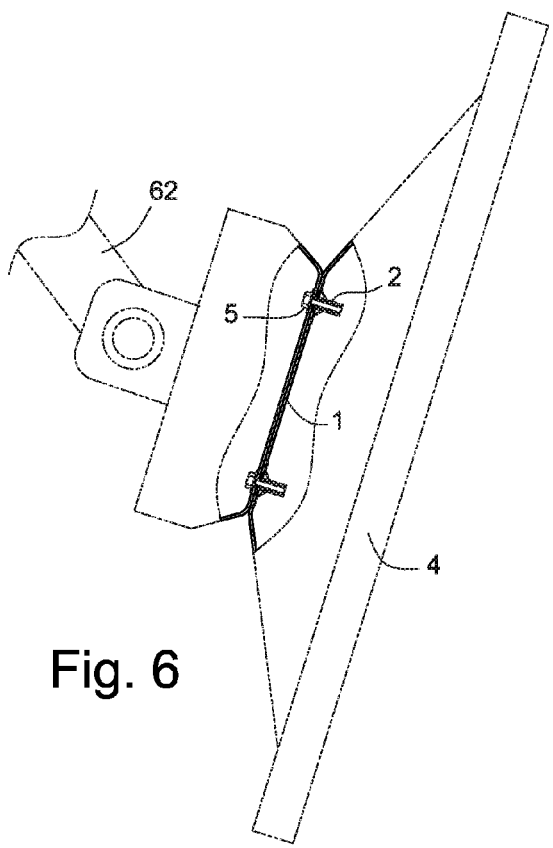
FIG. 6 is a schematic view showing a practical application of the fixing mechanism of FIG. 2.
Figure 7:
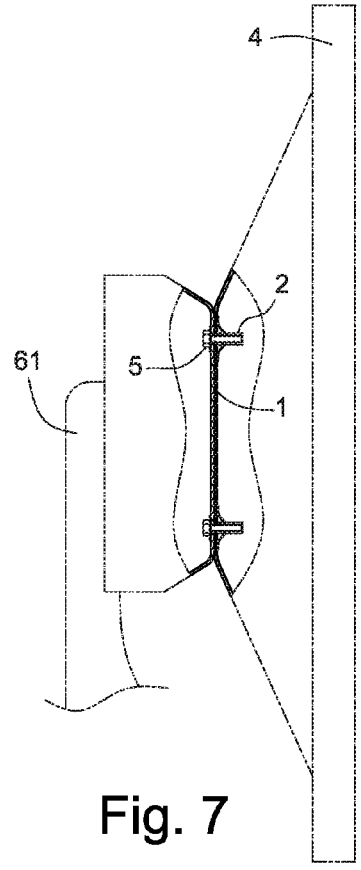
FIG. 7 is another schematic view showing another practical application of the fixing mechanism of FIG. 2.

The elastic clamping member 3 can be held using a fixture or a robot and then the elastic clamping member 3 is forcibly pressed to slide along the main body 22 (as shown in FIG. 5) with the main body 22 passing through the hole 320 such that the annulus end surface 31 is pressed against onto the base 1 at a location surrounding the through hole 11. The clamping portions 322 are engaged with the engaging groove 221 around the main body 22 to support the stud 2 being positioned on the base 1. It can be understood that the clamping portions 322 are also arranged around the stud 2. Preferably, the clamping portions 322 are arranged in an equal angle interval manner relative to the stud 2. Referring to FIGS. 5 and 7, the threaded hole 20 is used to engage with a bolt 5. The bolt 5 and the stud 2 can cooperatively fix the object 4 to a supporting member, for example, a stand 61 (as shown in FIG. 7) or a hanger 62 (as shown in FIG. 6). When the bolt 5 is screwed to the threaded hole 20 of the stud 2, the cap portion 21 of the stud 2 is non-rotatably received in the through hole 11, thus, the stud 2 can't be rotated with the bolt 5.

The elastic clamping member 3 is made of an elastic material; in addition, the clamping portions 322 are separated by the gaps 321. Thus, the clamping portions 322 are bendable and extractable to absorb force from the stud 2. In additions, the truncated cone surface 32 can be an interface to distribute the inner stress of the clamping portions 322. The truncated cone surface 32 is extended from the annulus end surface 3. Consider that the annulus end surface 31 is pressed against onto the base 1, so that the clamping member 3 is capable of distributing a force that is originally applied to the through hole 11 from the stud 2 to a peripheral area in the base 1 around the through hole 11. Therefore, the through hole 11 can be thus be protected from dilapidating or chapping. Moreover, the elastic clamping member 3 can improve a load capacity of the base 1 and the stud 2. The fixing mechanism of the present embodiment has more stability, reliability and lifetime.

Figure 8:
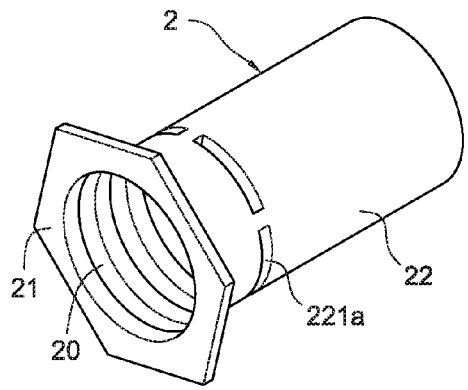
FIG. 8 is a prospective view showing another embodiment of present fixing mechanism.

In another embodiment, the engaging groove 221 (as shown in FIGS. 2 and 3) is annulus concave shaped and is arranged around the main body 22 of the stud 2. An end of each of the clamping portions 322 can be received in the engaging groove 221. In still another embodiment, the engaging groove 221 includes a number of concave groove portions 221a. The concave groove portions 221a surround the main body 22 (as shown in FIG. 8).

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A fixing mechanism, comprising:
 a base arranged at a side of an object, the base comprising a through hole;
 a stud comprising a cap portion received in the through hole and a hollow cylindrical main body passing through the through hole, wherein an inner cylindrical surface of the main body is threaded and an engaging groove is defined on an outer cylindrical surface of the main body; and
 an elastic clamping member comprising an annulus end surface, a truncated cone surface extending from an inner edge of the annulus end surface, a plurality of gaps being radially arranged in the truncated cone surface thereby defining a plurality of clamping portions between the gaps, so as to form an opening in the elastic clamping member for the main body of the stud to pass through, the annulus end surface being attached onto the base at a location surrounding the through hole, and the clamping portions being engaged with the engaging groove thereby cooperatively clamping the stud for being positioned on the base.

2. The fixing mechanism as claimed in claim 1, wherein the through hole includes a receiving groove and a through hole portion, the through hole portion being capable of allowing the main body to pass through and the cap portion being structured to mate with the receiving groove such that the cap portion is non-rotatably received in the receiving groove.

3. The fixing mechanism as claimed in claim 1, wherein the engaging groove is arranged around the main body of the stud.

4. The fixing mechanism as claimed in claim 1, wherein a plurality of concave groove portions are defined in the engaging groove for engaging with the clamping portions.

5. The fixing mechanism as claimed in claim 1, wherein a bolt is engaged with the stud by screwing in the hollow cylindrical main body, the bolt and the stud cooperatively fixing the object on a predetermined supporting member.

6. A fixing mechanism for fixing a base on an object, comprising:
   a stud including a hollow cylindrical body with a threaded inner cylindrical surface, the stud passing through the base, an engaging groove is defined in an outer cylindrical surface of the stud; and
   an elastic clamping member comprising an end surface and a plurality of clamping portions extending inwards from the end surface, the clamping portions being engaged with the engaging groove thereby cooperatively clamping the stud.

7. The fixing mechanism as claimed in claim 6, wherein each of the clamping portions is spaced apart from each other.

8. The fixing mechanism as claimed in claim 6, wherein the clamping portions surround the stud.

9. The fixing mechanism as claimed in claim 6, wherein the stud is perpendicular to the end surface.

10. The fixing mechanism as claimed in claim 9, wherein the clamping portions are arranged in an equal angle interval manner relative to the stud.

11. A assembly, comprising:
    an object;
    a base;
    a stud including a hollow cylindrical body with a threaded inner cylindrical surface, the stud passing through the object and the base, an engaging groove is defined in an outer cylindrical surface of the stud; and
    an elastic clamping member comprising an end surface and a plurality of clamping portions extending inwards from the end surface, the end surface is in contact with the base, the clamping portions being engaged with the engaging groove thereby cooperatively clamping the stud.

* * * * *